(12) United States Patent
Hayrapetyan et al.

(10) Patent No.: US 12,143,393 B2
(45) Date of Patent: *Nov. 12, 2024

(54) MODIFYING NETWORK RELATIONSHIPS USING A HETEROGENOUS NETWORK FLOWS GRAPH

(71) Applicant: VMware LLC, Palo Alto, CA (US)

(72) Inventors: Karen Hayrapetyan, Palo Alto, CA (US); Sunitha Krishna, Palo Alto, CA (US); Nikash Walia, San Jose, CA (US); Margaret Petrus, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/582,943

(22) Filed: Jan. 24, 2022

(65) Prior Publication Data
US 2023/0239306 A1 Jul. 27, 2023

(51) Int. Cl.
*H04L 9/40* (2022.01)
*G06F 16/23* (2019.01)
*G06N 20/00* (2019.01)
*H04L 41/0813* (2022.01)
*H04L 41/12* (2022.01)

(52) U.S. Cl.
CPC ........ *H04L 63/104* (2013.01); *G06F 16/2365* (2019.01); *G06N 20/00* (2019.01); *H04L 41/0813* (2013.01); *H04L 41/12* (2013.01)

(58) Field of Classification Search
CPC .... H04L 63/104; H04L 63/1425; H04L 63/20
See application file for complete search history.

(56) References Cited

U.S. PATENT DOCUMENTS

| | | | |
|---|---|---|---|
| 10,003,605 B2 * | 6/2018 | Muddu | G06N 20/00 |
| 11,228,603 B1 * | 1/2022 | Anand | G06N 20/00 |
| 11,483,282 B1 * | 10/2022 | Rubin-Smith | H04L 61/5007 |
| 11,727,248 B2 * | 8/2023 | Xu | G06N 3/04 |
| | | | 706/29 |
| 2019/0327271 A1 * | 10/2019 | Saxena | G06F 8/38 |
| 2020/0233864 A1 * | 7/2020 | Jin | G06F 16/288 |
| 2021/0021616 A1 * | 1/2021 | Shabtai | H04L 63/145 |
| 2021/0158149 A1 * | 5/2021 | Zhang | G06N 3/04 |
| 2022/0060883 A1 * | 2/2022 | Zhu | H04W 8/245 |
| 2022/0150109 A1 * | 5/2022 | Pethe | H04L 45/02 |

* cited by examiner

*Primary Examiner* — Linglan Edwards
(74) *Attorney, Agent, or Firm* — King Intellectual Asset Management (57) ABSTRACT

Systems and methods are described for recommending security groups using graph-based learning models. A server can create a network graph that illustrates network flows between devices in a network and security groups that the devices belong to. The network graph can include nodes that represent the devices and security groups. The server can apply a graph-based learning model to learn embeddings of the nodes and create vectors using the embeddings. Using vectors of two nodes, the server can calculate a vector that represents an edge between the two nodes. The server can apply a binary classifier determine whether the edge should exist. A "true" classification between two nodes can indicate that they should be able to communicate, and vice versa. A "true" classification between a device node and a security group node can indicate that the device should be assigned to the security group, and vice versa.

20 Claims, 7 Drawing Sheets

MODIFYING NETWORK RELATIONSHIPS USING A HETEROGENOUS NETWORK FLOWS GRAPH

BACKGROUND

Existing security groups are manually labeled groups created by network information technology specialists to group together computing devices, including virtual machines ("VMs"), with similar network traffic behavior. The security groups can be dictated by the nodes they interact with and the port and protocol they operate on. As a network grows, so does the number of security groups, making it difficult to review and identify needed changes. Currently, the only way to reconfigure security group assignments is through manual heuristic-based classification, which becomes increasingly more difficult as a network grows and VMs are added and removed.

Moreover, amorphous networks with frequent changes to devices can end up with devices communicating when they should not be, or not communicating when they should. In addition, different security groups can have overlapping member devices, indicating a potential redundancy that can negatively impact efficiency. Businesses are unable to detect needed changes quickly enough through current manual processes.

As a result, a need exists for identifying and correcting relationships between devices in a network and security groups they are assigned to.

SUMMARY

Examples described herein include systems and methods for modifying network relationships using a heterogenous network flows graph (referred to interchangeably as "heterogenous network flows graph, "heterogenous network graph," "network flows graph," or simply "network graph"). A distributed analytics engine can collect network flows data relating to a network. The network flows data can indicate how data flows between devices in a network and what protocols the devices use to communicate. For example, the network flow data can indicate in what direction data flows between two devices and the port and protocol used to communicate. The network flows data can also indicate security groups each device is assigned to.

An application can receive or retrieve the network flows data and use it to construct a heterogenous network graph. The network graph can illustrate the network flows data using nodes an edges. For example, the network graph can include a node type representing network devices, including individual network VMs, and a node type representing security groups. Different edge types can be used for illustrating relationships between nodes. For example, the network graph can include directed and undirected edges. Directed edges can be illustrated as an arrow between two device nodes that indicates network traffic flow between them. Undirected edges can be illustrated as a line connecting a device node to a security group node that indicates that the device belongs to the security group. The graph can also be broken down further to show specific port and protocol combinations, which devices communicate on them, and their corresponding security groups.

The server can use various techniques to determine whether an edge should exist (i.e., whether two devices should be communicating or whether a device should belong to a security group). For example, the server can apply a graph-based learning model to the network graph to learn representations or embeddings for each node in a latent vector space. A latent vector space can be a representation of data in which similar data points are closer together in space. The graph embedding technique can be applied using any algorithmic framework for representational learning of graphs. Some possible frameworks that can be used include metapath2vec, node2vec, DeepWalk, Graph Neural Network ("GNN"), and GraphSAGE models.

The graph embedding model can generate a low-dimensional vector representation for each node using the learned embeddings. As used herein, the term "node vector" refers to a vector representation for a node in a network graph. As an example, the graph embedding technique can learn embeddings by performing random walks from the nodes. A walk can refer to a distinct sequence of vertices and edges in a graph. In other words, a walk can represent an ordered list of nodes branching out from the starting node. The walks can be used to teach the model which nodes are in the neighborhood of each other and guide the model in generating embeddings for the nodes in the walk. A node's vector can therefore be a contextual representation of the corresponding device or security group based on neighboring nodes, their attributes, and the device or security group's structural position in the latent vector space.

The vectors for each node can be of uniform dimension for processing purposes. For example, each vector can be a 128-dimension vector. If fewer than 128 values are learned in embedding a vector for a node, then the vector can include null values in the vector representation.

After generating vector representations of each node in the network graph, the server can calculate vectors for edges in the network graph. As used herein, the term "edge vector" refers to a vector representation for an edge in a network graph. The edge vectors can be calculated using the node vectors for the nodes that an edge connects to. One method that can be used for calculating an edge vector is by taking a norm of the edge's corresponding node vectors, such as an L1 or L2 norm. The resulting edge vector can therefore be a contextual representation of the corresponding edge based on neighboring nodes and their attributes.

Finally, the server can apply a binary classifier to an edge vector to determine whether an edge should exist. A binary classifier can be a classification method that outputs one of two possible results, such as "0" or "1" and "true" or "false." Some examples of binary classifiers that can be used are a logistic regression, decision tree, random forest, support vector machine, neural network, or probit model. The results of the binary classification can be used to determine edges that should be added or removed. In other words, the binary classification can be used to determine that an existing communication channel between two devices should be closed, that a communication channel should be opened between two devices, that a device should be added to a security group, or that a device should be removed from a security group.

The server can also apply a clustering algorithm to security group nodes to identify security groups that can be consolidated. For example, if two security groups have a high enough overlap of policies, assigned devices, or assigned groups, this can be identified by applying the clustering algorithm to the node vectors for two security groups.

The server can communicate with an administrator ("admin") console to receive feedback from an admin user. For example, an admin can review the results and indicate any errors. The server can then use the feedback to retrain the graph-based learning model. The admin console can also allow the admin to test the models by removing edges or inserting fake edges into network graphs to evaluate the model's performance.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for modifying network relationships using a heterogenous network flows graph. An application can create a heterogenous network flows graph that illustrates network flows between devices in a network and security groups that the devices belong to. The network graph can include nodes that represent the devices and security groups and edges between nodes that represent associations between nodes. The application can use a graph-based learning model to create vectors for the nodes. Using vectors of two nodes, the application can calculate a vector that represents an edge between the two nodes. The application can then apply a binary classifier to determine whether the edge should exist.

Figure 1:
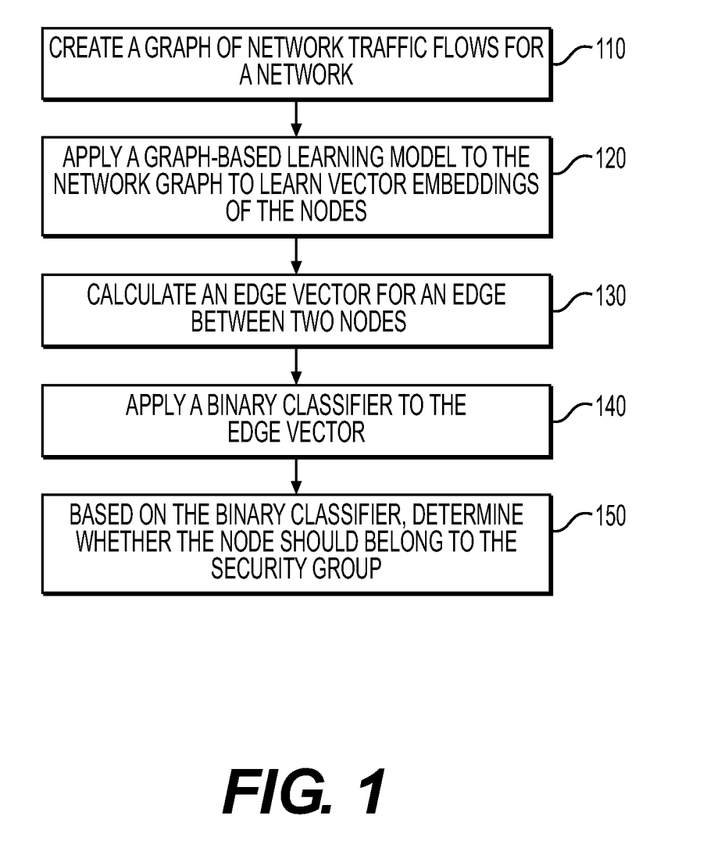
FIG. 1 is a flowchart of an example method for modifying network relationships using a heterogenous network flows graph.
Figure 2:
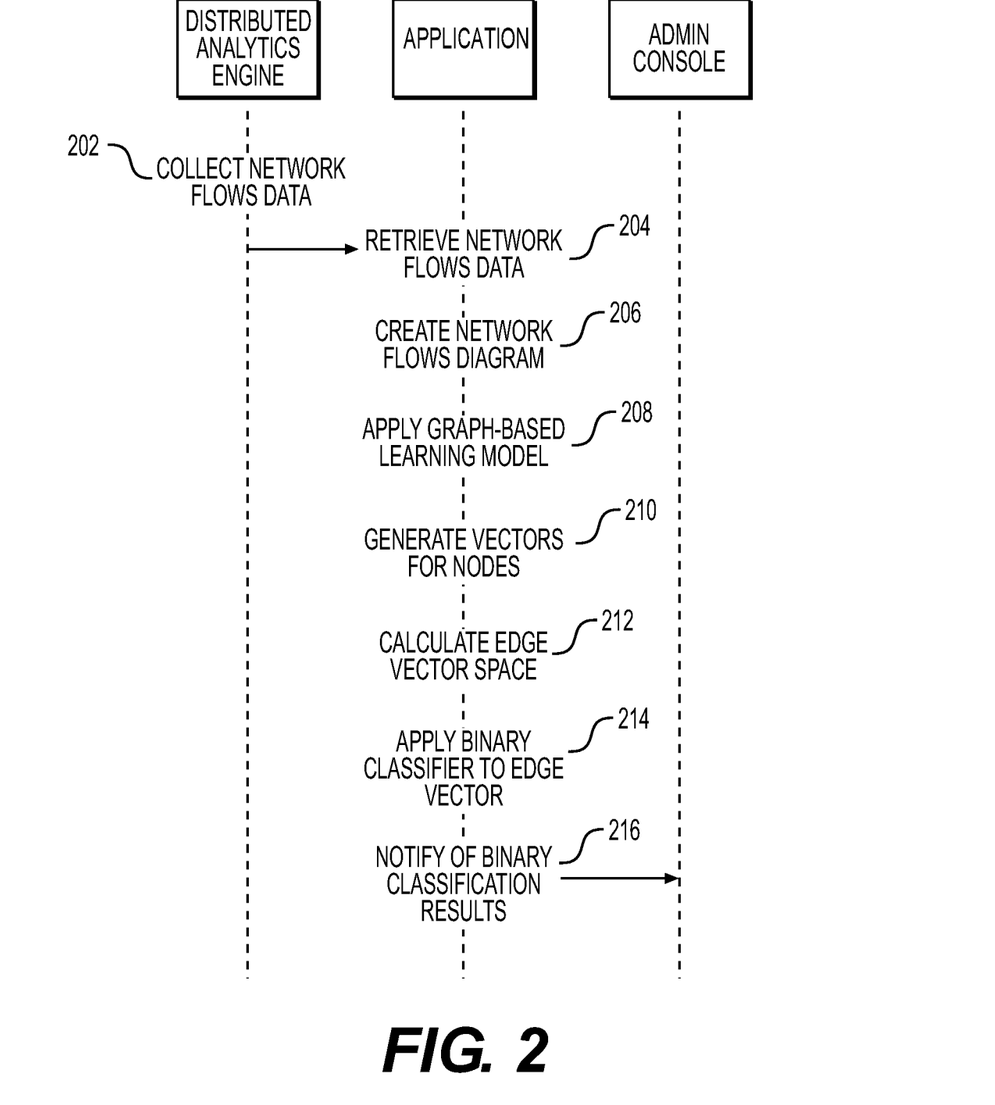
FIG. 2 is a sequence diagram of an example method for modifying network relationships using a heterogenous network flows graph.
Figure 3:
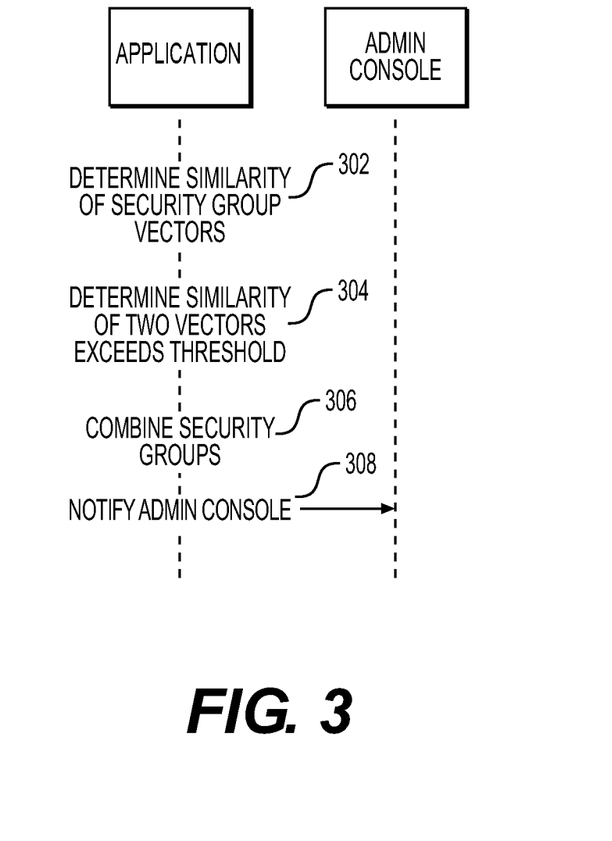
FIG. 3 is a sequence diagram of another example method for identifying network security groups that can be combined using a heterogenous network flows graph.
Figure 4:
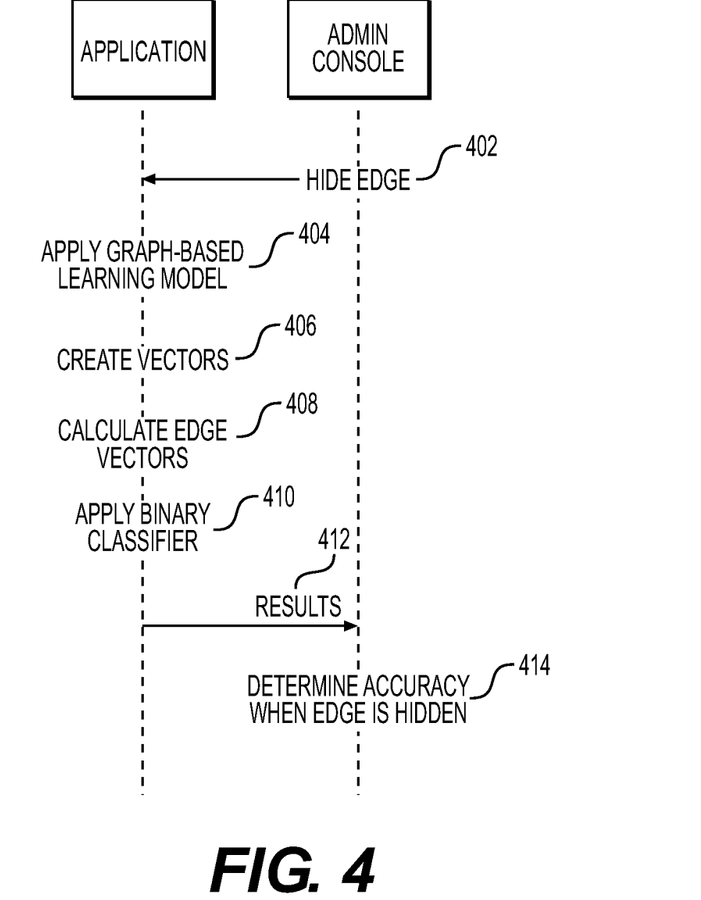
FIG. 4 is a sequence diagram of an example method for training graph-based learning models for modifying network relationships using a heterogenous network flows graph.
Figure 5:
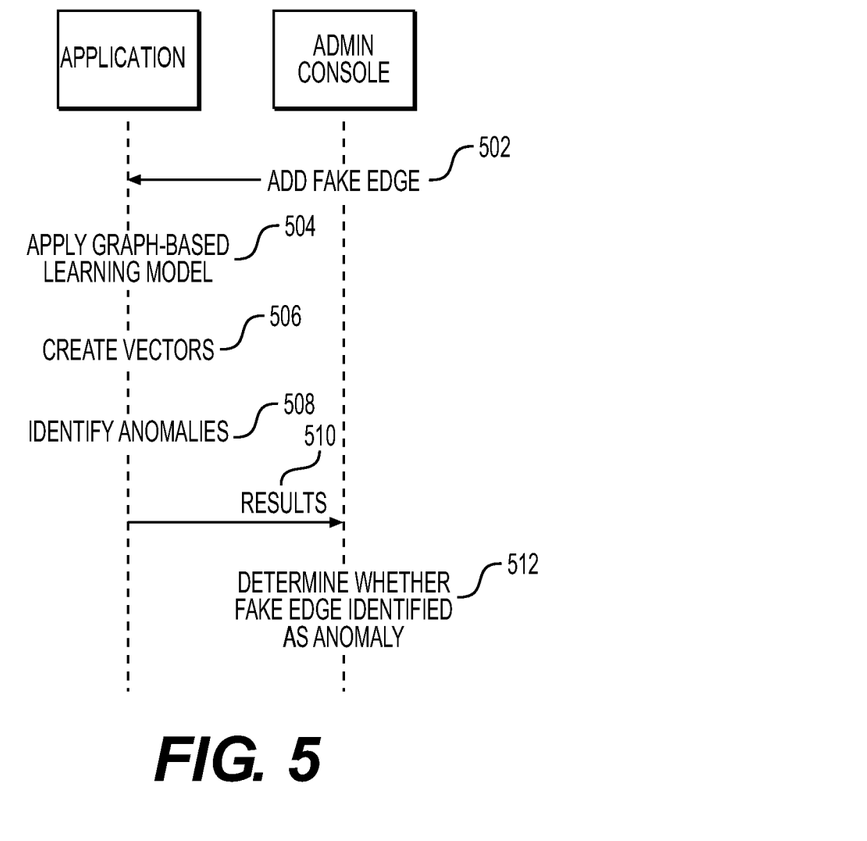
FIG. 5 is a sequence diagram of an example method for training graph-based learning models for modifying network relationships using a heterogenous network flows graph.
Figure 6A:
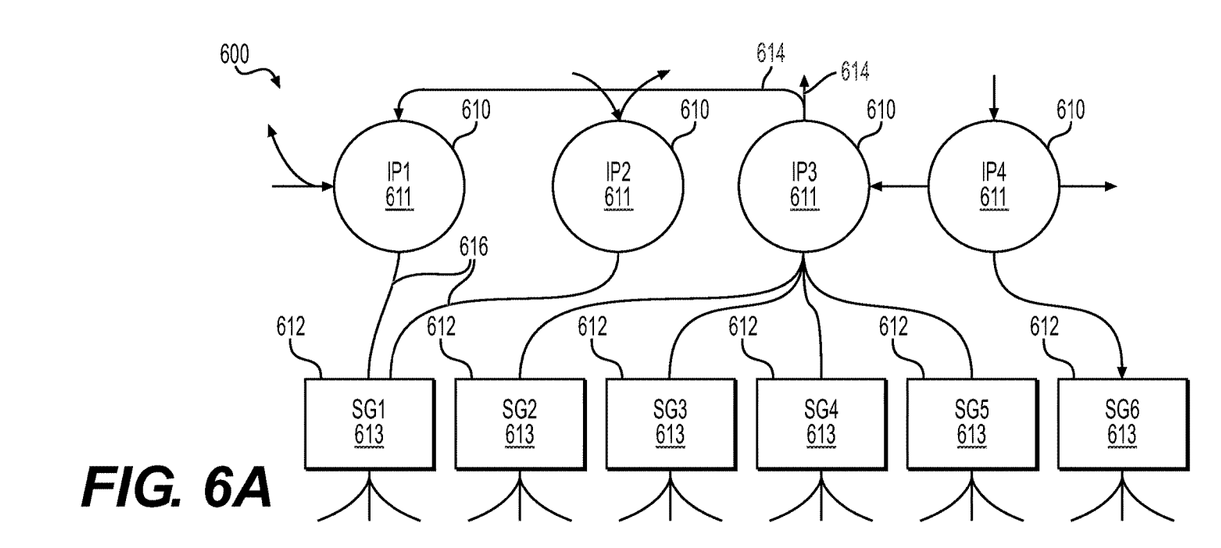
FIG. 6A is an illustration of an example heterogenous network flows graph that can be created for modifying network relationships.
Figure 6B:
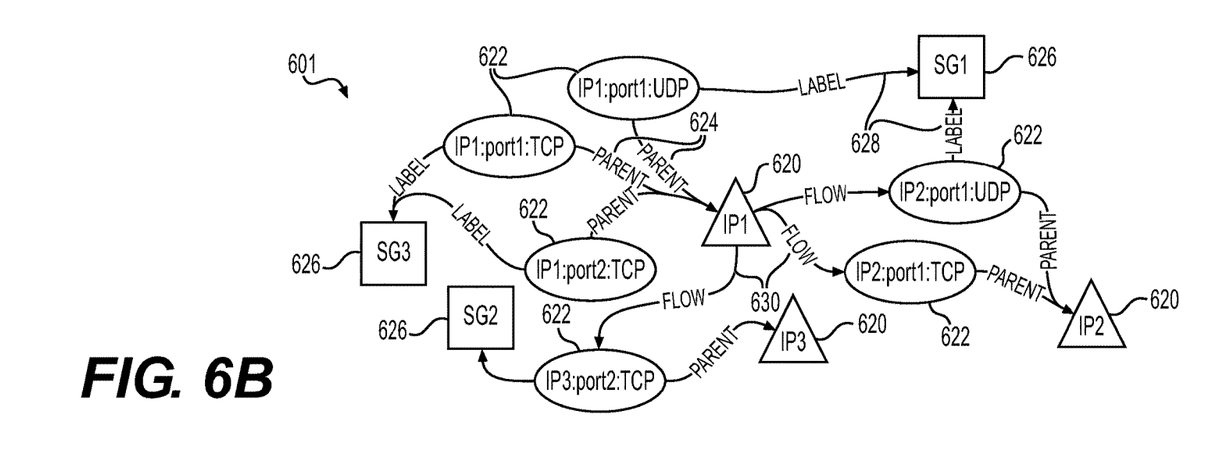
FIG. 6B is another illustration of another example network flows graph that can be created for modifying network relationships.
Figure 7:
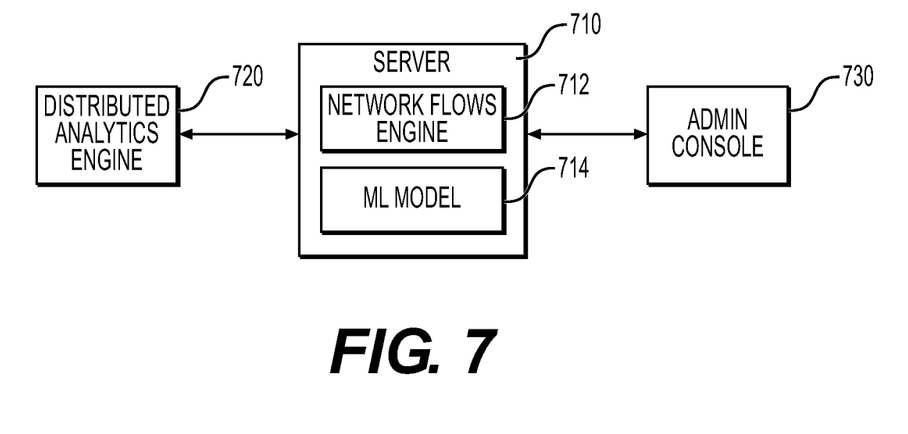
FIG. 7 is an illustration of an example system for modifying network relationships using a heterogenous network flows graph.

FIG. 1 is a flowchart of an example method for modifying network relationships using a heterogenous network flows graph. FIG. 2 is a sequence diagram of the example method described in FIG. 1. FIG. 3 is a sequence diagram of an example method of identifying that two security groups in a network that can be consolidated. FIG. 4 is a sequence diagram of an example method for training a graph-based learning model by removing existing edges from a network flows chart. FIG. 5 is a sequence diagram of an example method for training a graph-based learning model by adding a fake edge to a network flows chart. FIGS. 6A and 6B illustrate two types of network flows graphs that can be created from the same data set. The network flows graph illustrated in FIG. 6A has two node and edge types. The network flows graph illustrated in FIG. 6B has three node and edge types. FIG. 7 is an illustration of an example system that can be used to perform the methods described herein.

FIG. 1 is a flowchart of an example method for modifying network relationships using a heterogenous network flows graph. At stage 110, an application can create a heterogenous network flows graph of a network. The application can be an application or service with a backend layer for creating network flows graphs and modifying nodal relationships by applying graph-based learning models and binary classifiers. The application can be hosted by one or more servers or a group of servers, including multiple servers implemented virtually across multiple computing platforms. The application can also include a front-end interface that allows an admin to review results from the backend layer and provide input for retraining the graph-based learning models and binary classifiers. Alternatively, the application as a whole, the user interface thereof, or other components of the application may be installed directly on a user's device.

The application can create the network flows graph using network flows data that identifies unique flows in a network. A unique flow can represent a flow of network traffic from one network device to another. Network devices can include both physical or logical computing devices that communicates on a network, such as gateways, routers, switches, and VMs. The network flows data can be compiled by a distributed analytics engine, such as VMWARE NSX INTELLIGENCE. The network flows data can indicate how data flows between devices in a network and what port and protocol combinations the devices use to communicate. For example, the network flows data can indicate whether two devices communicate using Transmission Control Protocol ("TCP"), User Datagram Protocol ("UDP"), or another communication protocol. The network flows data can also indicate security groups that the network devices belong to. A security group can designate security rules for inbound and outbound traffic on any device belonging to the group. For example, security groups can be used to filter network traffic to and from resources in a virtual network. The security rules can act as a filter for accepting or denying network traffic.

In one example of network flows data, a unique flow can be represented by 4-tuples consisting of a source Internet Protocol ("IP") address, destination IP address, destination port, and communication protocol. The source IP address relates to the IP address of the device sending the communication (referred to throughout as the "sending device"), and the destination IP address and destination port relate to the device receiving the communication (referred to throughout as the "destination device") in a network flow. That is, the destination IP address is the IP address of the destination device, while the destination port is a port associated with the destination device. The communication protocol can reflect the type of communication protocol used to send the communication from the sending device to the destination device. Although the examples herein describe using an IP address to identify a device, other types of identifiers can be used, such as a universally unique identifier ("UUID") or globally unique identifier ("GUID"). The network flow data can also include data about security groups for the sending device at the port and protocol of the destination device. For example, the network flow data can identify one or more security groups associated with the sending device or destination device.

Although a destination device can be defined solely by its IP address (or other identifier), the combination of the destination IP address, destination port, and communication protocol (referred to throughout as an "IP:port:protocol combination") can represent a specific aspect of the destination device that can be useful in recommending security groups. As used herein, the term "port" refers to a logical transport layer that identifies where data or information is sent. Each IP:port:protocol combination of a device can be individually assigned to a security group. Network traffic received on an IP:port:protocol combination can be subject to the security rules of the security group to which the IP:port:protocol combination is assigned. Network traffic sent to a network device may therefore not all be subject to the same security rules. For example, network traffic received at one IP:port:protocol combination can be subject to the security rules of one security group, while network traffic sent to a second IP:port:protocol combination of the same network device can be subject to entirely different security rules based on the second IP:port:protocol combination being assigned to a different security group. Using this information, the application can recommend adding or removing security group assignments based on IP:port:protocol combinations instead of an entire device.

When creating a network graph, the application can create a graph structure by creating nodes for devices and security groups, and then linking the nodes for each unique flow. As used herein, a "link" can refer to a mechanism that the application can use to establish the kind of relationship between two nodes when creating a graph. For example, the application can extract the source IP addresses and destination IP addresses and create nodes for each unique IP address. The application can then use a "flow" link to indicate network data flow from a sending device to a destination device or a particular IP:port:protocol combination. The application can use a "belongs to" link to indicate security groups that sending devices, destination devices, and IP:port:protocol combinations belong to. The application can also use a "contained in" link to indicate a device that an IP:port:protocol combination belongs to. When creating the network graph, the application can connect the nodes based on the links. For example, for each pair of nodes linked in the graph structure, the application can connect the nodes with edges. The type of edge displayed in the graph can depend on the link. For example, for "flow" links, the chart can include directed edge connecting devices nodes (or an IP:port:protocol combination and a device node) in the direction that network traffic flows. For a "belongs to" link, that chart can include a line connecting a device node (or an IP:port:protocol combination) to the corresponding security group. For a "contained in" link, the chart can include a directed edge drawn from the IP:port:protocol combination node to the node of the device is belongs to, thereby illustrating the parent/child relationship.

The graph structure can be stored in a memory, such as Random-Access Memory ("RAM"), where it can be used to generate the network graph. Other types of data storage can be used to store the graph structure, such as a hard drive or database; however, memory may be preferred so that the graph structure can accessed more quickly.

Moving temporarily to FIG. 6A, illustrated is an example of a simple network graph 600 that the application can create from the network flows data. The simple network graph 600 does not include IP:port:protocol combinations in that example. The simple network graph 600 includes device nodes 610 that represent network devices and security group nodes 612 that represent security groups. Each device node 610 includes an associated unique identifier ("UID") 611, which, as previously described, can be an IP address, UUID, GUID, or other identifier ("ID"). Likewise, each security group node 612 includes an associated security group ID 613, which can include a name or unique ID of the security group. The simple network graph 600 includes flow edges 614, which are directed edges drawn between device nodes 610 to indicate network traffic flow. The flow edges 614 can be created based on the "flow" link described above. The device nodes 610 are connected to security group nodes 612 using security group edges 614. The security group edges 614 can be undirected edges that indicate security groups that the corresponding network devices belong to. The security group edges 614 can be created based on the "belongs to" link described above.

FIG. 6B illustrates a detailed network graph 601 that the application can create from the same data used to create the simple network graph 600. The detailed network graph 601 includes IP:port:protocol combinations. Like the simple network graph 600, the detailed network graph 601 also includes device nodes 620 that represent network devices and security group nodes 626 that represent security groups. In addition, the detailed network graph 601 includes IP:port:protocol nodes 622. Parent edges 624 can be used to indicate the device node 620 that an IP:port:protocol node 622 belongs to. The parent edges 624 can be created based on the "contained in" link described above. Flow edges 630 can indicate network traffic flow from a device node 620 to an IP:port:protocol node 622. The flow edges 630 can be created based on the "flow" link described above. Security group edges 628 can connect IP:port:protocol nodes 624 to a security group node 626 to indicate security groups that the corresponding IP:port:protocol combinations belong to. The security group edges 628 can be created based on the "belongs to" link described above.

Returning to FIG. 1, at stage 120, the application can apply a graph-based learning model to the network graph to learn vector embeddings of the nodes. The graph-based learning model can be any algorithmic framework for representational learning of graphs. Some possible models that can be used include metapath2vec, node2vec, DeepWalk, GNN, and GraphSAGE. As discussed herein, an embedding can refer to a set of quantitative values, put into vector form, that represents a property of a node. Properties can include any details about a node, such as the identity and attributes of neighboring nodes and that of nodes that the neighboring nodes connect to. A vector space can therefore contextually represent a node using numerical values. The graph-based learning model can generate a low-dimensional vector representation for each node using the learned embeddings. As an example, the graph-based learning model can learn embeddings by performing random walks from the nodes. A walk can refer to a distinct sequence of vertices and edges in a graph. In other words, a walk can represent an ordered list of nodes branching out from the starting node. The embeddings for each random walk can include attribute information for each node in the walk. For example, the walks can be used to teach the model which nodes are in the neighborhood of each other and guide the model in generating embeddings for the nodes in the walk. A node's vector can therefore be a contextual representation of the corresponding device or security group based on neighboring nodes, their attributes, and the device or security group's structural position in the latent vector space. Nodes structurally positioned near each other in the latent vector space are likely to have similar attributes and exhibit similar behavior.

The dimension of the node vectors can vary so long as the node vectors are all the same size. For example, the graph-based learning model can create 128-dimensional vectors for each node. If there is insufficient data to fill all 128 vectors, then a vector can have empty values. The dimension (i.e., the number of vectors) of the vectors can vary and can be set by an administrator or the application.

Because training vector embeddings for an entire network can be extremely time consuming and expensive, the vector embeddings for devices and security groups in a network can be stored in a database. The graph-based learning model can then use the saved embeddings instead of generating new embeddings every time a change occurs on the network. The application can be configured to periodically, or after being commanded by an admin, retrain the network to relearn the embeddings. For new devices or security groups, the graph-based learning model can generate a vector with embedding representations based on a weighted average of their multi-hop neighborhood. A "hop" can refer to a subsequent device in a unique data flow. For example, the first set of nodes that a node connects to are one hop away, and the set of nodes that the first set connect to are two hops away. The further away a node is, whether by device-to-device communication or device-security group assignment, the less the pre-existing embedding will contribute towards the embedding of the new device. The vector created for a new node can therefore be a contextual representation of its surrounding devices and security groups.

At stage 130, the application can calculate an edge vector for an edge between two nodes. One method that can be used for calculating an edge vector is by taking a norm of the vectors of two nodes that an edges connects to, such as two device nodes or a device node and a security group node. A norm can be a normal function of two vectors. For example, the norm can be an L1 norm, which sums the absolute values of two vectors, or an L2 norm, which calculates a Euclidean distance between two vectors. The method used to calculate the edge vector can be set by an admin. The application can calculate an edge vector for each edge of the graph. The application can also calculate an edge vector for nodes that are not connected by an edge. Such a new edge vector can be used to determine whether an edge should be created. In other words, a new edge vector can indicate that two devices should be communicating, based on their relationship, or that a device or IP:port:protocol combination should be added to a certain security group.

At stage 140, the application can apply a binary classifier to the edge vector calculated at stage 130. A binary classifier can be a classification method that outputs one of two possible results, such as "0" or "1" and "true" or "false." Some examples of binary classifiers that can be used are a logistic regression, decision tree, random forest, support vector machine, neural network, or probit model. The type of binary classifier used can be selected manually by an admin and automatically by the application.

The binary classifier can compare the edge vector to a threshold value when determining the output result. Meeting or exceeding the threshold value can result in a particular binary classifying being applied. The application can allow an admin to set or adjust the threshold value. For example, if the binary classifier frequently outputs incorrect results, an admin can manually change the threshold value accordingly.

In an alternative example, the admin can review the results and simply indicate incorrect classifications. The application can use the input from the admin to retrain the graph-based learning model, binary classifier, or both, to better predict whether an edge should exist.

At stage 150, the application can determine whether an edge between two nodes should exist based on the binary classification. For example, the binary classifier can output a "true" or a "false" value, where true indicates that an edge should exist and false indicates that an edge should not exist. In other words, the binary classification of the edge vector between two devices nodes can indicate whether the two devices should be communicating. For example, in amorphous networks where devices or network VMs are frequently added and removed, some network data traffic can end up getting routed through extra devices before reaching its endpoint. This can waste computing resources and cause network delays. The edge vector classification can be used to determine a more efficient path for the network traffic the reduces the number of devices that the traffic passes through. The edge vector classification can also be used to detect anomalous communications that can be indicative of a security issue. For example, anomalous communications can be caused by malicious actors with unauthorized access to the network. The application can automatically terminate such communications or notify an admin for review. The binary classification of an edge vector between a device or IP:port:protocol combination and a security group can indicate whether the device or IP:port:protocol combination should belong to the security group.

The binary classification results can be used to modify network configuration settings for a network. For example, a database that stores security group assignments can be updated to add or remove devices and IP:port:protocol combinations from security groups, network devices can be reconfigured to start or stop communicating with other network devices, and so on. Such configuration changes can be performed manually by an admin or automatically by a application. An admin can also be presented with the results for manual review. Any errors can be reported by the admin, and the graph-based learning model and binary classifier can be retrained as needed to improve future results.

FIG. 2 is a sequence diagram of an example method for modifying network relationships using a heterogenous network flows graph. This method includes examples where edges associated with a device are calculated to determine whether the device should belong to security group or be communicating with another particular device. At stage 202, the distributed analytics engine can collect data on network flows for a network. The network flows data can indicate which other devices that a device communicates with and what protocol they use to communicate. The network flows data can also indicate security groups that the devices and IP:port:protocol combinations belong to.

At stage 204, the application can retrieve the network flows data. For example, the data can be stored on a separate device, such as a database application, and the application can retrieve the data from that device, such as with a database query. In one example, because some networks can be vast and complicated, the application can retrieve a portion of the network flows data that corresponds to a portion of a network.

At stage 206, the application can create a network flows graph using the network flows data. The structure of the graph and the types of nodes and edges can vary based on need. For example, if IP:port:protocol combinations do not need to be included, the application can create a graph like the simple network graph 600 illustrated in FIG. 6A. Alternatively, if IP:port:protocol combinations should be included, the application can create a graph like the detailed network graph 601 illustrated in FIG. 6B.

At stage 208, the application can apply a graph-based learning model to the network flows graph. A graph-based learning model can be any algorithmic framework for representational learning of graphs. For example, the graph-based learning model can be a metapath2vec, node2vec, DeepWalk, GNN, or GraphSAGE model. The network flows graph created at stage 206 can be provided as an input to the graph-based learning model.

At stage 210, the graph-based learning model can generate vectors for nodes in the network flows graph. The graph-based learning model can create the vectors by learning embeddings for each node. The exact method used to learn the embeddings can depend on the model used. One example of such a method can include performing random walks from the nodes. A walk can refer to a distinct sequence of vertices and edges in a graph. In other words, a walk can represent an ordered list of nodes branching out from the starting node. The embeddings for each random walk can include attribute information for each node in the walk. For example, the walks can be used to teach the model which nodes are in the neighborhood of each other and guide the model in generating embeddings for the nodes in the walk. Using the learned embeddings, the graph embedding model can generate a low-dimensional vector representation for each node. A node's vector can therefore be a contextual representation of the corresponding device or security group based on neighboring nodes, their attributes, and the device or security group's structural position in the associated latent vector space. The graph-based learning model can create vectors for each node type, including nodes for devices, security groups, and IP:port:protocol combinations.

At stage 212, the graph-based learning model can calculate vector representations for edges in the network flows graph. For example, the application can take a norm of vector pairs corresponding to nodes in the graph connected by an edge, resulting in a vector that represents an edge between the two nodes. The graph-based learning model can also calculate edge vectors for each pair of device nodes in the same region of a network not connected by an edge. The resulting edge vector can be used to determine where devices not communicating with each other should be communicating or whether a device should belong to a security group that it does not belong to. The application can also calculate an edge vector for each combination device node or IP:port:protocol node and security node to determine which security groups that the devices or IP:port:protocol combinations should belong to. The norm can be an L1 or L2 norm, as some examples.

One method that can be used for calculating an edge vector is by taking a norm of the edge's corresponding node vectors, such as an L1 or L2 norm. The resulting edge vector can therefore be a contextual representation of the corresponding edge based on neighboring nodes and their attributes. The method used to calculate the edge vector can be set by an admin or automatically by the application.

At stage 214, the application can apply binary classifiers to the edge vectors. A binary classifier can be a classification method that outputs one of two possible results. Some examples of binary classifiers that can be used are a logistic regression, decision tree, random forest, support vector machine, neural network, or probit model.

At stage 216, the application can notify an admin console of the binary classification results. For example, the binary classification results can indicate whether an edge should exist (i.e., whether a device should belong to a particular security group or communicate with a particular device). An admin can review the results at the admin console and determine whether any changes need to be made. For example, if the application erroneously determines that two devices should not be communicating or that a device or IP:port:protocol combination should not belong to a security group, then the admin can correct the error. In one example, the application can use input from the admin to retrain the graph-based learning model, binary classifier, or both, to produce better results in the future.

The binary classification results can be used to modify network configuration settings for a network. For example, devices and IP:port:protocol combinations can be added to or removed from security groups, network devices can be configured to allow or deny communications with other network devices, and so on. Such configuration changes can be performed manually by an admin or automatically by a application based on the results from stage 216. Performing a configuration change can include updating a database that stores security group assignments, reconfiguring settings on a network device, or other similar actions. For example, the application can update a database to add or remove a network device (or IP:port:protocol combination) from a security group or reconfigure a network device to not communicate or start communicating with another network device.

FIG. 3 is a sequence diagram of an example method for identifying security groups in a network that can be consolidated using a heterogenous network flows graph. The sequence diagram reflects a method where security groups can be combined based on their similarity exceeding a threshold. The method illustrated in FIG. 3 can begin after stage 210 of FIG. 2. For example, prior to stage 302, a application can retrieve network flows data that was created by a distributed analytics engine. Using the network flows data, the application can create a network flows graph and apply a graph-based learning model to the graph to create vectors for the nodes in the graph.

At stage 302, the application can determine the similarity of two security group vectors. One method of determining the similarity can include comparing the two vectors to determine a percentage of similar or matching embeddings. Another method can include applying a clustering algorithm to identify when security group vectors have close embeddings to each other, which indicates a close semantic relationship between them. Examples of clustering algorithms that can be used can include density-based spatial clustering of applications with noise ("DBSCAN"), K-Means clustering, mean-shift clustering, and agglomerative hierarchical clustering.

At stage 304, the application can determine that the similarity of two security group vectors exceeds a threshold. For example, when using a clustering algorithm, the algorithm can output a value representing a similarity level of the two vectors. In another example, the application can apply a binary classifier to the two vectors, and the output can indicate whether the security groups exceed a similarity threshold.

At stage 306, the application can combine the two security groups. For example, the application can cause one security group to be absorbed into the other by combining security policies and assigning all devices previously assigned to only the absorbed security group to the remaining security group. The application can create a new security group that includes all the policies of the other two and assign all devices in either security group to the new security group. The application can also remove or archive the two security groups used to create the new group.

At stage 308, the application can notify an admin console of the combining of the security groups. This can allow an admin to review the change to the security groups and, if necessary, reject the changes. If the admin rejects the changes, then the application can retrain the graph-based learning model and clustering algorithms accordingly with this feedback. The application can also combine the security groups. For example, the application can update a database that stores security group. The application can also log the update so that it can be undone by an admin if needed.

FIG. 4 is a sequence diagram of an example method for training a graph-based learning model to identify missing edges in heterogenous network flows graphs by hiding an existing edge from a graph. The method illustrated in FIG. 4 can begin after stage 206 of FIG. 2. For example, prior to stage 402, a application can retrieve network flows data that was created by a distributed analytics engine. Using the network flows data, the application can create a network flows graph.

At stage 402, an admin, using the admin console, can hide an edge in the network flows graph. The admin can hide the edge using any available method, such as using an interface at the admin console that provides an interactive visual representation of the network flows graph. The admin can also set up a testing environment with the network flows graph loaded to it or upload an image of a graph that the application can interpret.

At stage 404, the application can apply the graph-based learning model to the modified network flows graph. A graph-based learning model can be any algorithmic framework for representational learning of graphs. For example, the graph-based learning model can be a metapath2vec, node2vec, DeepWalk, GNN, or GraphSAGE model.

At stage 406, the graph-based learning model can create vectors for nodes in the modified network flows graph. One technique that can be used for creating vectors is a graph embedding technique. For example, the graph-based learning model can perform random walks from a node and input data about the walks into dimensions of the node's vector. The graph-based learning model can create vectors for each node type, including nodes for devices, security groups, and IP:port:protocol combinations.

At stage 408, the graph-based learning model can calculate edge vectors. For example, the application can take a norm of vector pairs corresponding to nodes in the graph connected by an edge, resulting in a vector that represents an edge between the two nodes. The graph-based learning model can also calculate edge vectors for each pair of device nodes in the same region of a network not connected by an edge. The norm can be an L1 or L2 norm, as some examples.

At stage 410, the application can apply a binary classifier to the edge vectors. A binary classifier can be a classification method that outputs one of two possible results. Some examples of binary classifiers that can be used are a logistic regression, decision tree, random forest, support vector machine, neural network, or probit model.

At stage 412, the application can send the results to the admin console. For example, the binary classification results can indicate whether an edge should exist (i.e., whether a device should belong to a particular security group or communicate with a particular device). The application can send these results to an admin console where they can be displayed for an admin for review.

At stage 414, the admin can determine the accuracy of the results. For example, the admin can determine whether the graph-based learning model correctly determined that an edge should exist where the admin removed an edge. If the model did not determine that the hidden edge should exist, then the admin can provide input for retraining the graph-based learning model and binary classification models. Similarly, if the application made a correct determination that the hidden edge should exist, the admin can confirm this determination to provide feedback for reinforcing the graph-based learning and binary classification models.

FIG. 5 is an illustration of an example method for training a graph-based learning model to identify anomalous network relationships by adding a fake edge into a heterogenous network flows graph. The method illustrated in FIG. 5 can begin after stage 206 of FIG. 2. For example, prior to stage 502, a application can retrieve network flows data that was provided by a distributed analytics engine. Using the network flows data, the application can create a network flows graph.

At stage 502, an admin, using the admin console, can add a fake edge in the network flows graph, such as by indicating that an edge exists between two nodes when that edge did not previously exist in the graph. The admin can add the fake edge using any available method, such as using an interface at the admin console, setting up a testing environment, or uploading an image of a graph that the application can interpret.

At stage 504, the application can apply the graph-based learning model to the network flows graph. A graph-based learning model can be any algorithmic framework for representational learning of graphs. For example, the graph-based learning model can be a metapath2vec, node2vec, DeepWalk, GNN, and GraphSAGE model.

At stage 506, the graph-based learning model can create vectors for nodes in the network flows graph. One technique that can be used for creating vectors is a graph embedding technique. For example, the graph-based learning model can perform random walks from a node and input data about the walks into dimensions of the node's vector. The graph-based learning model can create vectors for each node type, including nodes for devices, security groups, and IP:port:protocol combinations.

At stage 508, the application can identify anomalies in the network flows. For example, the application can calculate edge vectors between nodes and apply a binary classification model to the edge vectors. The application can then compare the binary classification results to the existing edges in the graph to identify any existing edges that received a "false" binary classification.

At stage 510, the application can send the results to the admin console. The application can send results for all the edge vectors or just the anomalies. The application can also cause the detected anomalies to be displayed in the admin console for review. At stage 512, the admin can determine whether the application correctly identified the fake edge as an anomaly. If the application did not identify the fake edge as an anomaly, then the admin can provide input identifying the fake edge for retraining the graph-based learning and binary classification models so that the application can better identify existing edges that should not exist.

FIGS. 6A and 6B are illustrations example network flows graphs used for modifying network relationships. Although the network flows graphs differ in structure, they can be created from the same network flows data set. FIG. 6A illustrates a simple graph 600, such as the simple graph described regarding stage 206 of FIG. 2 earlier herein. FIG.

6B illustrates a detailed graph 601, such as the detailed graph described regarding stage 206 of FIG. 2 earlier herein.

As shown in FIG. 6A, the simple graph 600 can include node types for devices and security groups. The device nodes 610 are nodes that represent devices, and security group nodes 612 are nodes that represent security groups. The simple graph 600 can include two edge types: data flow edges 614 and security group edges 616. Data flow edges 614 can connect device nodes according to network traffic flow. The data flow edges 614 in the simple graph 600 are illustrated as directed edges. The arrow direction of the data flow edges 614 can indicate the direction of network traffic flow. For example, as shown in the simple graph 600, one data flow edge 614 shows that the device node IP4 610 sends network traffic to the device node IP3 610, and another data flow edge 614 show that the device node IP3 610 sends network traffic to the device node IP1 610. Security group edges 616 can be undirected edges that indicate the security groups that a device node is assigned to. The security group edges 616 in the simple graph 600 are illustrated as undirected edges (i.e. lines without an arrow). For example, as shown in the simple graph 600, the device nodes IP1 and IP2 610 belong to the security group SG1 613, the device node IP3 610 belongs to security groups SG2, SG3, SG4, and SG5 612, and the device node IP4 610 does not belong to a security group but includes an edge to SG6.

Moving to FIG. 6B, the detailed graph 601 can include additional information about each device node. For example, the device nodes can be broken up into two node types: parent nodes 620 representing the devices themselves and child nodes 622 representing the IP:port:protocol combinations of the devices. A parent edge 624 can connect each child node 622 to its corresponding parent node 620. For example, as shown in the detailed graph 601, parent edges 624 indicate that IP1:port1:UDP, IP1:port1:TCP, and IP1:port2:TCP are IP:port:protocol combinations for the device IP1. Flow edges 630 can indicate how traffic flows from a device node 620 to a child node 622 of another device. For example, as shown in the detailed graph 601, flow edges 630 indicate that the IP1 device sends network traffic to the IP2:port1:UDP and IP2:port1:TCP combinations of the IP2 device and the IP3:port2:TCP combination of the IP3 device. In some networks, IP:port:protocol combinations of a device can belong to different security groups. The detailed graph 601 illustrates these security group assignments with label edges 628 drawn from the child nodes 622 to security group nodes 626. For example, the label edges 628 indicate that the IP2:port1:UDP combination of the IP2 device and the IP1:port1:UDP combination of the IP1 device both belong to the SG1 security groups.

FIG. 7 is an illustration of an example system for recommending security groups using graph-based learning models. A server 710 can be responsible for modifying network traffic flow and security group assignments of a network using the methods described herein. The server can be a single server or a group of servers, including multiple servers implemented virtually across multiple computing platforms, including a cloud-based platform. The server 710 can retrieve network flows data from a distributed analytics engine 720. The distributed analytics engine 720 can be hosted on a server, which can be the same or different from the server 710. The distributed analytics engine 720 can compile data related to the configuration of a network, including data identifying unique data flows and security group assignments. The server 710 can retrieve the network flows data from the server hosting the distributed analytics engine 720 or to a database where the distributed analytics engine 720 saves the network flows data.

A network flows engine 712 on the server 710 can build a graph from the network flows data. The network flows engine 712 can correspond the application, or a backend layer of the application, described previously herein. The graph can include one set of nodes representing network devices, one set of nodes representing security groups, and edges connecting the nodes as indicated by the network flows data. The network flows engine 712 can also create vectors for the nodes by applying a machine learning ("ML") model 714. The ML model 714 can be any algorithmic framework for representational learning of graphs, such as a graph-based learning model. The network flows engine 712 can be configured to calculate edge vectors that are representative of connections between nodes. The network flows engine 712 can apply a binary classifier to the edge vectors to determine whether an edge should exist. Some examples of a binary classifier can include a logistic regression, decision tree, random forest, support vector machine, neural network, or probit model.

The server 710 can send results to an admin console 730 where an admin can perform a review. When an admin provides feedback indicating an error in the results, then the server can retrain the ML model 714 to better identify edges that should or should not exist. The server 710 can have the capability to automatically implement changes to a network based on the results. For example, the server 710 can add or remove devices or IP:port:protocol combinations to or from security groups and open or shut communication channels between network devices. The changes can also be implemented by an admin on the admin console 730.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method, comprising:
creating a graph of network traffic flows for a network, the graph including a first device node that represents a first network device and a first security group node that represents a first security group, wherein the graph indicates that the first network device belongs to the first security group;
applying a graph-based learning model to the graph to create a first vector that represents the first device node and a second vector that represents the first security group node;
calculating a norm of the first and second vectors to create a third vector that represents an edge between the first device node and the first security group node;
applying a binary classifier to the third vector;
based on an output of the binary classifier, updating a database that stores security group information to remove the first network device from the first security group;

based on removal of the first network device from the first security group, modifying network configuration settings of the network; and filtering network traffic of the first network device based on the modified network configuration settings.

2. The method of claim 1, wherein the first network device is a virtual machine (VM).

3. The method of claim 1, further comprising:
comparing the second vector to a fourth vector, the fourth vector representing a second security group node;
based on the comparison, determining a similarity level between the second vector and the fourth vector;
determining that the similarity level exceeds a threshold; and
updating the database to combine the first and second security groups into a single security group.

4. The method of claim 1, further comprising:
adding a false edge to the graph;
applying the graph-based learning model; and
determining whether the graph-based learning model identifies the false edge as an anomaly.

5. The method of claim 1, further comprising:
removing the edge between the first device node and the first security group node;
applying the graph-based learning model; and
determining whether the graph-based learning model predicts that the edge should exist.

6. The method of claim 1, wherein the binary classifier is a logistic regression model.

7. The method of claim 1, wherein the graph-based learning model is a metapath2vec algorithm.

8. A non-transitory, computer-readable medium containing instructions executable by a processor to perform operations comprising:
creating a graph of network traffic flows for a network, the graph including a first device node that represents a first network device and a first security group node that represents a first security group, wherein the graph indicates that the first network device belongs to the first security group;
applying a graph-based learning model to the graph to create a first vector that represents the first device node and a second vector that represents the first security group node;
calculating a norm of the first and second vectors to create a third vector that represents an edge between the first device node and the first security group node;
applying a binary classifier to the third vector;
based on an output of the binary classifier, updating a database that stores security group information to remove the first network device from the first security group;
based on removal of the first network device from the first security group, modifying network configuration settings of the network; and
filtering network traffic of the first network device based on the modified network configuration settings.

9. The non-transitory, computer-readable medium of claim 8, wherein the first network device is a virtual machine (VM).

10. The non-transitory, computer-readable medium of claim 8, the operations further comprising:
comparing the second vector to a fourth vector, the fourth vector representing a second security group node;
based on the comparison, determining a similarity level between the second vector and the fourth vector;
determining that the similarity level exceeds a threshold; and
updating the database to combine the first and second security groups into a single security group.

11. The non-transitory, computer-readable medium of claim 8, the operations further comprising:
adding a false node to the graph;
applying the graph-based learning model; and
determining whether the graph-based learning model identifies the false node as an anomaly.

12. The non-transitory, computer-readable medium of claim 11, the operations further comprising:
removing the edge between the first device node and the first security group node;
applying the graph-based learning model; and
determining whether the graph-based learning model indicates that the edge should exist.

13. The non-transitory, computer-readable medium of claim 8, wherein the binary classifier is a logistic regression model.

14. The non-transitory, computer-readable medium of claim 8, wherein the graph-based learning model is a metapath2vec algorithm.

15. A system for modifying network relationships using a heterogenous network flows graph, comprising:
a processor;
a non-transitory, computer-readable medium comprising instructions executable by the processor to perform operations comprising:
creating a graph of network traffic flows for a network, the graph including a first device node that represents a first network device and a first security group node that represents a first security group, wherein the graph indicates that the first network device belongs to the first security group;
applying a graph-based learning model to the graph to create a first vector that represents the first device node and a second vector that represents the first security group node;
calculating a norm of the first and second vectors to create a third vector that represents an edge between the first device node and the first security group node;
applying a binary classifier to the third vector;
based on an output of the binary classifier, updating a database that stores security group information to remove the first network device from the first security group;
based on removal of the first network device from the first security group, modifying network configuration settings of the network; and
filtering network traffic of the first network device based on the modified network configuration settings.

16. The system of claim 15, wherein the first network device is a virtual machine (VM).

17. The system of claim 15, the operations further comprising:
comparing the second vector to a fourth vector, the fourth vector representing a second security group node;
based on the comparison, determining a similarity level between the second vector and the fourth vector;
determining that the similarity level exceeds a threshold; and
updating the database to combine the first and second security groups into a single security group.

18. The system of claim 15, the operations further comprising:
- adding a false node to the graph;
- applying the graph-based learning model; and
- determining whether the graph-based learning model identifies the false node as an anomaly.

19. The system of claim 18, the operations further comprising:
- removing the edge between the first device node and the first security group node;
- applying the graph-based learning model; and
- determining whether the graph-based learning model indicates that the edge should exist.

20. The system of claim 15, wherein the binary classifier is a logistic regression model.

* * * * *